United States Patent [19]
Duesberg et al.

[11] Patent Number: 4,605,155
[45] Date of Patent: Aug. 12, 1986

[54] METHOD OF REPAIRING HIDDEN LEAKS IN TUBES

[75] Inventors: Joseph D. Duesberg, Canoga Park; Raymond C. Mills, Sr., Oxnard, both of Calif.

[73] Assignee: The United States of America as represented by the Administrator, National Aeronautics and Space Administration, Washington, D.C.

[21] Appl. No.: 770,920

[22] Filed: Aug. 30, 1985

[51] Int. Cl.[4] .............................................. F16L 55/18
[52] U.S. Cl. ...................................... 228/119; 138/97; 165/76; 29/402.16
[58] Field of Search .................. 228/119; 138/97, 98, 138/99; 165/76; 29/402.09, 402.16

[56] References Cited

U.S. PATENT DOCUMENTS

| | | | |
|---|---|---|---|
| 3,643,701 | 2/1972 | Wadiak et al. | 138/97 |
| 3,962,767 | 6/1976 | Byerley et al. | 228/119 |
| 4,413,765 | 11/1983 | Tracy | 228/119 |

FOREIGN PATENT DOCUMENTS

| | | | |
|---|---|---|---|
| 56192 | 4/1982 | Japan | 228/119 |
| 1348792 | 3/1974 | United Kingdom | 228/119 |

Primary Examiner—Nicholas P. Godici
Assistant Examiner—Samuel Mark Heinrich
Attorney, Agent, or Firm—Joseph H. Beumer; John R. Manning; Leon D. Wofford, Jr.

[57] ABSTRACT

A method of repairing a tubular assembly in which access to a defect in the tube is limited includes the steps of cutting an opening in the tube on the side opposite the defect so as to expose the defect from the inside of the tube. A tubular insert is inserted into the tube to cover the defect and is secured in place by means of brazing or welding. The remaining space between the opening and insert is closed by means of close-out patches which are welded or brazed to both the insert and the tube. The result is a permanent repair having great structural integrity.

16 Claims, 3 Drawing Figures

U.S. Patent     Aug. 12, 1986     4,605,155

METHOD OF REPAIRING HIDDEN LEAKS IN TUBES

ORIGIN OF THE INVENTION

The invention described herein was made in the performance of work under a NASA contract and is subject to the provisions of 305 of the National Aeronautics and Space Act of 1958, Public Law 85-568 (72 Stat. 435; 42 U.S.C. 2457).

BACKGROUND OF THE INVENTION

1. Field of the Invention

The present invention relates to a method for repairing leaks or cracks in tubes. More particularly, the present invention relates to a method for repairing hidden cracks in tubular assemblies where tubes are bundled together or bonded to a supporting shell, such as in heat exchangers. In such assemblies, the access to the area of the tube adjacent the wall is limited, and it is extremely difficult to repair leaks or fatigue cracks which develop in these areas.

2. Description of the Prior Art

Various methods have been developed for repairing damaged tubes. Such methods are disclosed in U.S. Pat. No. 3,643,701 to Wadiak et al, in which a rupture is repaired by enlarging a tube to form an opening big enough to accept a pipe section therein. Each end of the pipe section includes a gasket which can be expanded to engage the sidewalls of the tube to provide temporary repair. U.S. Pat. No. 3,807,024 to Harvey et al discloses a method of repairing a damaged tube in an upright finned tube wall in which the tube and its associated fins are cut out over the damaged region and a new length of tube secured to the cutaway region. U.S. Pat. No. 3,962,767 to Byerley et al discloses a method for repairing a heat exchanger tube in which the tube is severed and a sleeve is welded inside the tube to cover a defect in the tube. The last two mentioned patents require cutting through an entire portion of the tube and therefore cannot be conveniently employed in situations where access to the tube is restricted. The Wadiak patent is directed to a temporary repair method and requires a relatively complicated pipe section having axially expandable gaskets at each end.

SUMMARY OF THE INVENTION

The present invention provides a method of permanent repair of tubes or conduits where access to the crack or leak is limited to the side of the tube opposite the crack or leak. Access to the defect is gained by cutting away a portion of the tube opposite the leak. A tubular insert is inserted into the opening to cover the defect and is welded or brazed into place. This effectively isolates the failed section of tubing and restores structural integrity. Patches are then brazed or welded to close up openings at each end between the insert and the tube. The repair procedure provides structural support to the area that has failed and uninterrupted flow without significantly altering the heat transfer profile.

BRIEF DESCRIPTION OF THE DRAWINGS

The invention will be described with reference to the accompanying drawings, wherein.

DESCRIPTION OF THE PREFERRED EMBODIMENT

The following description is of the best presently contemplated mode of carrying out the invention. This description is made for the purpose of illustrating the general principles of the invention and is not to be taken in a limiting sense. The scope of the invention is best determined by reference to the appended claims.

Figure 1:
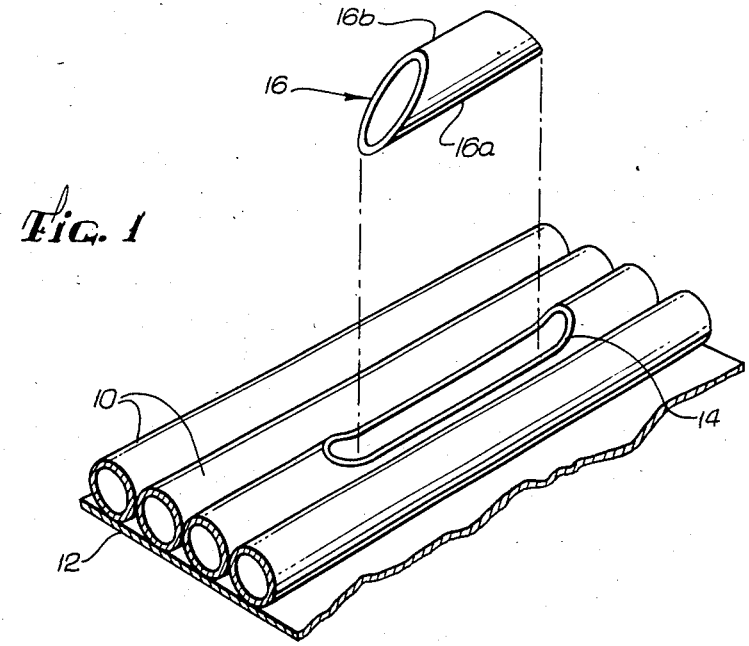
FIG. 1 is a perspective view of a tubular assembly illustrating the repair method for one tube of the assembly.

Referring to FIG. 1, a tubular assembly such as, for example, a nozzle-coolant assembly for a rocket engine, includes a plurality of metal tubes 10 which are bonded together and are attached to a cold wall section 12. The top exposed surface of the tubes opposite the cold wall form the hot wall of the assembly. Often, cracks or leaks will develop in the tubes adjacent the cold wall 12. It is not feasible to cut through the cold wall in order to gain access to the tube to repair the cracked portion. The present invention provides a method of repairing the tube without the necessity of cutting through the cold wall 12.

In order to repair a leak in a tube 10 adjacent the cold wall 12, a longitudinal opening 14 is cut into the hot wall of the tube, i.e., in the side of the tube opposite the defect. A tubular insert 16 whose length is less than that of the opening 14 is inserted into the opening. The insert has an outer circumference which is substantially equal to the inner circumference of the tube being repaired. In addition, the ends of the insert slant toward a common point so as to define a relatively long bottom portion 16a and a relatively short top portion 16b. The ends of the insert thus have oblong or "fish mouth" openings.

In order to facilitate positioning of the insert 16, the opening 14 must extend approximately around one-half of the circumference of the tube 10. The opening may be somewhat smaller than this if the tube 10 and/or insert 16 have some flexibility to enable the insert to be passed through the opening and into a seated relationship within the tube 10.

Figure 2:
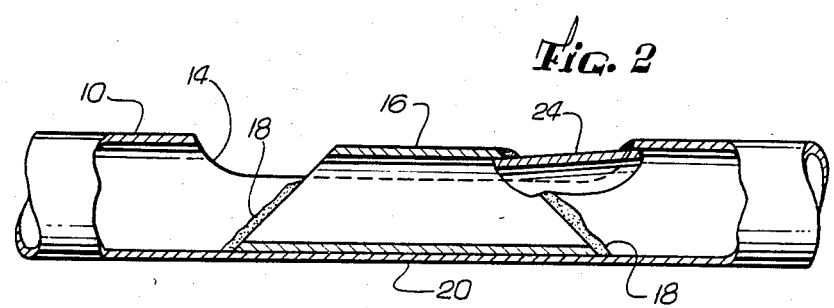
FIG. 2 is a side plan view, partially in section, of the tube being repaired with the repair insert and one repair patch in place.
Figure 3:
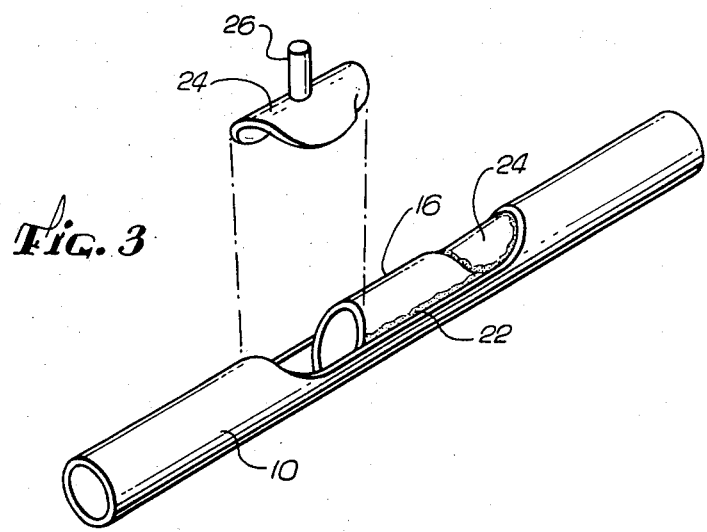
FIG. 3 is a perspective view of the tube being repaired illustrating patches which are employed in the repair method.

Referring to FIG. 2, the tubular insert 16, which is a metal insert, is secured to the tube 10 by tungsten-inert-gas (TIG) brazing or welding at the intersection 18 between the ends of the insert and the interior wall of the tube 10. The slanted ends of the insert 16 expose the areas to be brazed or welded to the opening 14 as well as increasing the length of the intersection between the insert and the tube 10. In FIG. 2, a defect in the tube is illustrated at 20, and the bottom relatively long side of the insert 16 covers the defect 20. The welding or brazing effectively isolates the failed section of the tubing and restores structural integrity to that area. Longitudinal welding or brazing between the insert 16 and wall of the tube 10 at 22 may be necessary depending upon structural requirements. This is indicated at 22 in FIG. 3.

After the insert has been secured in the tube 10, metal close-out patches 24 are positioned over the remaining portion of the opening 14 and inside the surfaces of the tube 10 and insert 16. The patch is formed to follow the contours of the tube 10 and insert 16 and is provided with a rod-shaped handle 26. After insertion of a patch 24 into the opening 14, it is lifted into contact with the tube 10 and insert 16 by means of the handle 26 and brazed or welded into place. The handle 26 is then removed.

The length of the insert 16 is determined by functional requirements including local structural considerations and the condition of adjacent tubes in the assembly. In addition, when the adjacent tubes are repaired at the same location, the position of the inserts is staggered so that the brazing or welding points do not fall side by side.

The repair procedure of the present invention provides structural support to the area that has failed and uninterrupted flow without significantly altering the heat transfer profile. The method provides for permanent repair of defects without requiring removal of a full tubular portion and despite limited access to the tube being repaired. The use of a one-piece insert to cover the defect and close-out patches to seal the remainder of the opening greatly simplifies the repair procedure as well as providing great structural integrity.

What is claimed is:

1. A method of repairing a leak in a tube in which access to the tube in the area of the leak is restricted, comprising the steps of:

removing a portion of the tube wall from an accessible area of the tube near the leak to form an opening having a length along the tube;

inserting a tubular insert whose outer circumference is approximately equal to the inner circumference of the tube and whose length is shorter than the length of said opening made in the tube wall into said opening, and positioning the insert so the insert wall covers the leak and each end of the insert is accessible through a space between that end of the insert and the adjacent circumference of said opening;

securing the insert within the tube so as to seal the leak;

sealing each space between the end of the insert and the circumference of said opening with a patch to close the wall of the tube whereby a leak-free tube repair is obtained.

2. A method of claim 1 wherein the tube, insert, and patches are metal and the step of securing the insert and the step of sealing with patches are accomplished by welding.

3. A method of claim 1 wherein the tube, insert, and patches are metal and the step of securing the insert and the step of sealing with patches are accomplished by brazing.

4. The method of claim 1 wherein the patches are fitted within the tube and insert.

5. A method of claim 1 wherein said insert has ends which slant toward a common point to define a relatively long rear side and a relatively short front side, the step of positioning including the step of adjusting the insert so that the rear side covers the leak and the front side is exposed through said opening.

6. A method of claim 1 wherein said insert is secured to the tube at the intersection of the edges of the ends of the insert and the tube wall and at the intersection of of the wall of the isert and the tube wall at the edge of said opening.

7. The method of claim 5 wherein each patch follows the contours of the tube and insert.

8. The method of claim 6 wherein each patch is positioned by the use of a handle secured to its outer circumference.

9. A method of repairing a leak in a metal tube comprising the steps of:

cutting an opening in the tube wall in an area opposite the leak to remove about one-half of the circumference of the tube, said opening extending along the length of the tube and each side of the leak;

inserting a one-piece tubular metal insert whose circumference is approximately equal to the inner circumference of the tube and whose length is shorter than the length of said opening, said insert having ends which slant toward a common point to define a relatively long rear side and a relatively short front side, into said opening and positioning the insert so that said rear side covers the leak and so that said front side is exposed through said opening and each end of the insert is accessible through a space between that end of the insert and adjacent edge of said opening;

securing the insert to the tube so as to seal the leak;

sealing with a pair of patches the pair of spaces between the ends of the insert and adjacent edge of said opening, one patch for each space, to close the wall of the tube whereby a leak-free tube repair is obtained.

10. The method of claim 9 wherein the step of securing the insert is done by welding.

11. The mthod of claim 9 wherei the step of securing the insert is done by brazing.

12. The method of claim 9 wherein the insert is secured to the tube at the intersection of the ends of the insert and the tube wall .

13. The method of claim 12 wherein the insert is also secured to the tube at the intersection of the wall of the insert and the tube wall at the edge of the opening.

14. The method of claim 9 wherein the patches are metal and are welded in place.

15. The method of claim 9 wherein the patches are metal and are brazed in place.

16. The method of claim 9 wherein the patches are fitted within the tube and insert.

* * * * *